3,053,805
LINEAR POLYESTERS FROM 1,4-BIS(2'-HYDROXY-ETHOXY)-2,5-DITERTIARY BUTYLBENZENE

John R. Caldwell and Russell Gilkey, Kingsport, Tenn., assignors to Eastman Kodak Company, Rochester, N.Y., a corporation of New Jersey
No Drawing. Filed Dec. 21, 1959, Ser. No. 860,657
20 Claims. (Cl. 260—47)

This invention relates to linear polyesters comprising 1,4-bis-(2'-dihydroxyethoxy)-2,5-dietaritary butylbenzene condensed with primarily aromatic acids such as terephthalic acid, which polyesters melt at 200–300° C. Also contemplated are the fibers, films and other shaped forms of these polyesters, e.g. photographic film base.

The prior art discloses the preparation of polyesters using an aromatic ether glycol such as that used in accordance with the present invention without any nuclear substituents. The present invention is based upon the unobvious qualities attributed to the polyester by reason of the tertiary butyl substituents located on the aromatic nucleus. An especially unobvious feature of this invention relates to a polyester of the type generally contemplated by the invention which is further modified by the use of a glycol analogous to the butylated aromatic ether of the glycol of the invention but wherein the tertiary butyl radicals have been replaced with chlorine atoms whereby a polyester is produced which has many of the properties of polyethylene terephthalate with several superior features. Thus, it melts at approximately the same temperatures as polyethylene terephthalate and is characterized by other advantageous physical properties together with greatly improved dyeability and especially valuable qualities at the surface of shaped objects such as film which contribute to improved adhesion of coatings, other polymers, pigments, dyes, etc. Thus, a photographic film base prepared from this particular copolymer can be coated with subbing materials and photographic emulsions so as to produce a product having exceptionally meritorious properties with respect to unusually rigorous processing and other operations pertaining to photographic elements.

Among the unobvious features of this invention is the fact that the polyesters produced contain ether linkages and exceptionally bulky side groups which would normally be expected to reduce the melting points contrary to the discoveries of this invention.

It is an object of this invention to provide new high melting linear polyesters derived from butylated aromatic ether glycols and modifications thereof containing chlorinated aromatic ether glycols, especially such polyesters derived from aromatic dicarboxylic acids which may contain minor proportions of aliphatic dicarboxylic acids.

It is a further object of this invention to provide improved shaped objects derived from new and useful polyesters including fibers, films and the like.

It is also an object to provide modifications of such polyesters and such polyester products which have unusual characteristics such as a high capacity toward adhesion to coatings of other polymeric substances such as subbing materials used for coating photographic film base.

Other objects of this invention will become apparent elsewhere herein.

In accordance with a preferred embodiment of this invention there is provided a highly polymeric linear polyester of (A) at least one dicarboxylic acid consisting of at least 75 mole percent of a hexacarbocyclic dicarboxylic acid and (B) at least one glycol containing from 2 to 20 carbon atoms consisting of at least 35 mole percent of 1,4-bis(2'-hydroxyethoxy)-2,5-ditert.butylbenzene, which polyester melts at between about 200° C. and about 300° C., has an inherent viscosity of at least 0.4 measured in 60% phenol and 40% tetrachloroethane, and is capable of being formed into fibers.

As previously mentioned an especially useful embodiment of this invention provides a polyester as just defined wherein the glycol (B) is 1,4-bis(2'-hydroxyethoxy)-2,5-dichlorobenzene and 1,4-bis(2'-hydroxyethoxy)-2,5-ditertiarybutylbenzene.

The methods for preparing polyesters normally employed in the art can be used in practicing the present invention so as to produce the polymers described above. The condensation reaction can be advantageously facilitated by the employment of a catalyst. The best catalyst for each reaction is determined by the nature of the reactants. Generally, when an alkyl ester of the acidic compound is being employed, an ester interchange type of catalyst is to be preferred. Numerous patents have issued in the last few years describing numerous advantageous catalysts which can be employed. Various techniques as to the use of the catalysts are well known in the art. For example, if the free acid is being reacted with the free glycol, a catalyst is generally not added until after the preliminary condensation has gotten under way.

The reaction is generally begun in the presence of an excess of the glycol and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly polymeric condensation product produced as just described can be cooled, pulverized, and the powder heated to a temperature somewhat less than that employed during the last stage of the molten phase polymerization thereby avoiding coagulation of the solid particles. The solid phase polymerization is advantageously conducted until the desired degree of polymerization is achieved. The solid phase polymerization, among other things, results in a higher degree of polymerization without the accompanying degradation which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure.

Examples of hexacarbocyclic dicarboxylic acids wherein the carboxy radicals are attached to a hexacarbocyclic nucleus in para relationship include terephthalic acid, trans-hexahydroterephthalic acid, p,p'-sulfonyldibenzoic acid, 4,4'-diphenic acid, 4,4'-benzophenonedicarboxylic acid, 1,2 - di(p - carboxyphenyl)ethane, 4,4'-dicarboxydiphenyl ether, etc. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, α-ethylsuberic acid, α,α-diethyladipic acid, dimethylmalonic acid, dicarboxy diethyl ether, isophthalic acid, orthophthalic acid, hexahydro-orthophthalic acid, etc. Carbonic acid is an obvious equivalent included among these other acids. Another useful acid is sulfonyl dipivalic acid.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc. Moreover, aminoalcohols and/or aminocarboxy acids can also be used.

Examples of modifying glycols which can be employed in accordance with this invention include the polymethylene glycols containing from 2 to 10 or more carbon atoms such as ethylene glycol, 1,5-pentanediol, 1,10-decanediol, and other glycols of this series as well as the ether glycols such a diethylene glycol, triethylene glycol, etc. Branched chained aliphatic glycols which can be employed include 2,2-dimethyl-1,3-propanediol, 2-methyl-1,5-pentanediol, etc. Carbocyclic glycols can also be employed such as 1,4-di(hydroxyethyl)benzene, 1,4-bis(2'-hydroxyethoxy)-2,5-dichlorobenzene, etc. Other glycols which can be employed include various derivatives of those already mentioned which contain nitrogenous substituents or numerous other substituents which do not interfere with the formation of a highly polymeric linear polyester. Those familiar with the art will be aware of the effect of various substituents on melting points and other properties of the polyesters produced. It is well known that there is quite a variety of these glycols available for the preparation of linear polyesters.

The polyesters of this invention which contain a mixture of dicarboxylic organic acids have unexpectedly high melting points for modified polyesters of this character and in addition have improved dyeing qualities whereby fibers can be prepared which can be woven into fabrics which dye to deep shades without the use of a carrier as is generally employed with polyethylene terephthalate dyeing procedures.

The linear polyester compositions of this invention are generally characterized by superior weathering properties and resistance to moisture whereby the products having from the higher down to the relatively low melting points are markedly more efficacious than the products produced from glycols other than 1,4-bis(2'-hydroxyethoxy)-2,5-ditertiary butylbenzene.

The methods of forming the polyesters of this invention into fibers and films are well known in the art and need no elaboration herein; in brief, the polyesters of this invention can be heated and melt extruded followed by quenching, drawing, and heat setting employing techniques that are described in the prior art.

In preparing the polyesters of this invention a generally advantageous temperature range for the first step of the condensation is 180–230° C., at atmospheric pressure during which the alcohol is distilled off and then the temperature is raised to about 240–300° C. depending upon the melting point of the polyester which excess glycol is distilled off. As already mentioned the final phase using the melt technique is carried out advantageously under a high vacuum and with good agitation while excluding oxygen and moisture. When the solid-phase process is employed the pulverized prepolymer is then heated in vacuum or in an inert gas stream at 200–260° C. Of course, none of these temperatures is to be considered as having any degree of exactness but merely is illustrative of such temperatures as can be employed. Further illustrations will appear in the examples below.

In preparing the polyesters of this invention it has been found that when a second glycol is present as a modifier that the use of a relatively volatile second glycol materially increases the rate of build-up during the polymerization reaction. Thus, under the conditions of polymerization most of the butylated aromatic ether glycol will remain in the polymer while the volatile glycol will distill out to a large extent. The resulting copolyester will then contain a minor amount of the volatile glycol.

This invention can be further illustrated by the following examples of preferred embodiments although it will be understood that these examples are included merely for purposes of illustration and are not intended to limit the scope of the invention unless otherwise specifically indicated:

*Example 1*

A mixture of 93 g. (0.3 mole) of 1,4-bis(2'-hydroxyethoxy)-2,5-ditertiary butylbenzene and 49 g. (0.25 mole) of dimethyl terephthalate was placed in a reaction vessel equipped with a stirrer, a short distillation column, and an inlet for purified nitrogen. A solution of 0.1 g. sodium titanium butoxide in 2 ml. of butyl alcohol was added as catalyst and the mixture was stirred at 210–220° C. in an atmosphere of nitrogen. Methyl alcohol was distilled from the vessel until about 90% of the theoretical amount was collected. The temperature was then raised to 250° C. and held for 10 minutes. A vacuum of 0.2 mm. was applied at 240° C. and stirring was continued for 3 hours. A product with a high melt viscosity and a light amber color was obtained.

This polyester had a melting point, as determined under crossed nicols on the hot stage of a microscope, of 217–227° C. Fibers could be spun by extruding the melted polymer through a multi-hole spinneret. Strong, elastic fibers were obtained after drafting and heat stabilizing. The product was also valuable as a photographic film base and as a molding plastic.

*Example 2*

Use 125 g. (0.3 mole) of 4,4'-sulfonyldibenzoic acid, dibutyl ester instead of the dimethyl terephthalate in Example 1. The initial stage of the polymerization was carried out as before. Vacuum was applied at a temperature of 270° C. until a prepolymer with an inherent viscosity of approximately 0.3 was obtained. The prepolymer was pulverized to a particle size of 0.01–0.02 inches and subsequently was built up to a high viscosity by heating at 220° C. with stirring under a vacuum of 0.5 mm. for 4 hours.

This polyester had a melting range of 233–240° C. It is crystalline and is useful for the manufacture of films and fibers.

*Example 3*

A polyester was prepared from 1,4-bis(2'-hydroxyethoxy)-2,5-ditertiary butylbenzene and 4,4'-diphenic acid, dibutyl ester by the method use in Example 2. This polymer melted in the range 255–270° C. and was useful for the manufacture of fibers, films, and molded objects.

*Example 4*

A copolyester having the composition, 1 mole terephthalic acid+0.5 mole 1,4-bis(2'-hydroxyethoxy)-2,5-dichlorobenzene+0.5 mole 1,4-bis(2'-hydroxyethoxy)2,5-ditertiary butylbenzene was prepared. It was crystalline and melted in the range 250–260° C. Fibers, films, and plastics could be obtained from the polymer by melt extrusion. The fibers were tough and elastic and dyed well with disperse dyes.

Film extruded from this polyester was found to have especially advantageous properties with respect to the preparation of coated photographic film. Such properties appear to be advantageously present in percentage ranges of the chlorinated aromatic ether glycol from about 35 to 65% with the remainder of the glycol being the butylated aromatic ether glycol. Film extruded from such a polyester can be coated with polymeric subbing materials well known in the art such as those derived from vinylidene chloride, itaconic or methacrylic acid, methylmethacrylate, etc. A much broader range of such polymeric subbings can be used by virtue of the composition of the polyesters of this aspect of the present invention.

*Example 5*

A copolyester was prepared from an initial ratio of 1 mole terephthalic ester+0.6 mole 1,4-bis(2'-hydroxyethoxy)-2,5-ditertiary butyl benzene+0.7 mole tetramethylene glycol. The final polymer contained approximately 40 mole percent of the tetramethylene glycol. The polymer was made by melt polymerization at 240° C. under vacuum. It has a melting point of 215–225° C. and can be used in the production of tough, elastic plastic articles.

Many other polyesters can be prepared using proportions of components within the ranges described above so as to produce polyesters including modified polyesters having softening points in the range of about 200° C. on up to above about 300° C. For example, a polyester derived from using the trans isomer of 1,4-cyclohexanedicarboxylic acid can be produced having a softening range aproaching about 200° C.

As already made apparent the polyesters from chlorinated aromatic ether glycols have unusual properties. These properties are characteristic of homopolymers of such chlorinated aromatic ether glycols wherein the benzene ring comprises 2,5-dichloro-, 2,3,5-trichloro- and 2,3,5,6-tetrachlorobenzene derivatives. Such derivatives are conveniently made by treating the chloro hydroquinone compounds with ethylene oxide or an ethylene chlorohydrin in the presence of alkali. The polyesters from 1,4-bis(2'-hydroxyethoxy) - 2,5 - dichlorobenzene when used together with other glycols and condensed with aromatic acids such as terephthalic acid produce especially advantageous modified polyesters of which a particularly preferred embodiment is set forth in Example 4 hereinabove.

One observation which applies to polyesters in general is the fact that enhanced solubility in inorganic solvents can be obtained when there is branching on the glycol portion of the molecule but this is normally considered to apply primarily to the improved solubility obtained by replacement of a straight chain glycol with a branched chain glycol. For example, the terephthalic polyesters of pentane-1,5-diol are considerably less soluble than the polyesters of neopentyl glycol. Other glycols which confer improved solubility upon polyesters include the following:

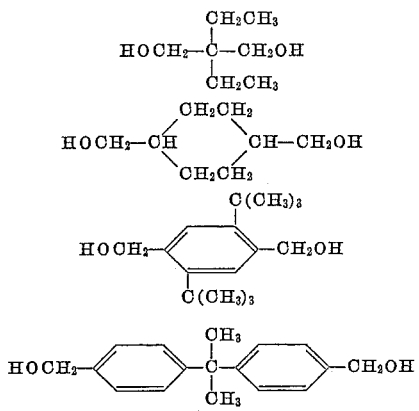

The polyesters of the present invention have advantageous solbility characteristics which can be further enhanced by using modifying glycols of the type already referred to. Solubility characteristics are further taken advantage of by selecting an especially advantageous solvent such as trichlorobenzene, hexamethylphosphoramide, triphenyl phosphite, etc. Of course, mixtures of solvents can be used so as to include solvents which are useful for various types of polymers, e.g. triphenyl phosphate, triphenyl phosphene, dimethyl formamide, various halogenated aromatic compounds in addition to the above-mentioned trichlorobenzene, etc. Polyester solutions can be used in coating materials, adhesives, binders, emulsions, film casting, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A highly polymeric linear polyester of (A) from 100 to 75 mole percent of a hexacarbocyclic dicarboxylic acid and from 0 to 25 mole percent of a different bifunctional dicarboxylic acid selected from the group consisting of an aliphatic dicarboxylic acid having from 2 to 10 carbon atoms, isophthalic acid, orthophthalic acid, hexahydrophthalic acid, and sulfonyl dipivalic acid and (B) from 0 to 65 mole percent of a glycol containing from 2 to 20 carbon atoms and from 100 to 35 mole percent of 1,4 - bis(2'-hydroxyethoxy)-2,5-ditert.butylbenzene which is different from the aforesaid glycol, which polyester melts at between about 200° C. and about 300° C., has an inherent viscosity of at least 0.4 measured in 60% phenol and 40% tetrachloroethane, and is capable of being formed into fibers.

2. A polyester as defined by claim 1 wherein the glycol (B) is essentially entirely composed of said 1,4-bis(2'-hydroxyethoxy)-2,5-ditert.butylbenzene.

3. A polyester as defined by claim 2 where the dicarboxylic acid (A) is terephthalic acid.

4. A polyester as defined by claim 2 wherein the dicarboxylic acid (A) is 4,4'-diphenic acid.

5. A polyester as defined by claim 2 wherein the dicarboxylic acid (A) is 4,4'-sulfonyldibenzoic acid.

6. A polyester as defined by claim 1 wherein the dicarboxylic acid (A) is essentially entirely composed of terephthalic acid.

7. A polyester as defined by claim 6 wherein the glycol (B) is 1,4-bis(2'-hydroxyethoxy)-2,5-dichlorobenzene and 1,4-bis(2'-hydroxyethoxy)-2,5-ditertiary butylbenzene.

8. A polyester as defined by Claim 6 wherein the glycol (B) is tetramethylene glycol and 1,4-bis(2'-hydroxyethoxy)-2,5-ditertiary butylbenzene.

9. A fiber of the polyester defined by claim 1.
10. A fiber of the polyester defined by claim 2.
11. A fiber of the polyester defined by claim 3.
12. A fiber of the polyester defined by claim 6.
13. A fiber of the polyester defined by claim 7.
14. A fiber of the polyester defined by claim 8.
15. A film of the polyester defined by claim 1.
16. A film of the polyester defined by claim 2.
17. A film of the polyester defined by claim 3.
18. A film of the polyester defined by claim 6.
19. A film of the polyester defined by claim 7.
20. A film of the polyester defined by claim 8.

References Cited in the file of this patent
UNITED STATES PATENTS
2,762,789    Fischer et al. _____ Sept. 11, 1956